April 5, 1960     D. G. UNTHANK     2,931,409
COLLAPSIBLE TANKS
Filed Aug. 11, 1958     2 Sheets-Sheet 1
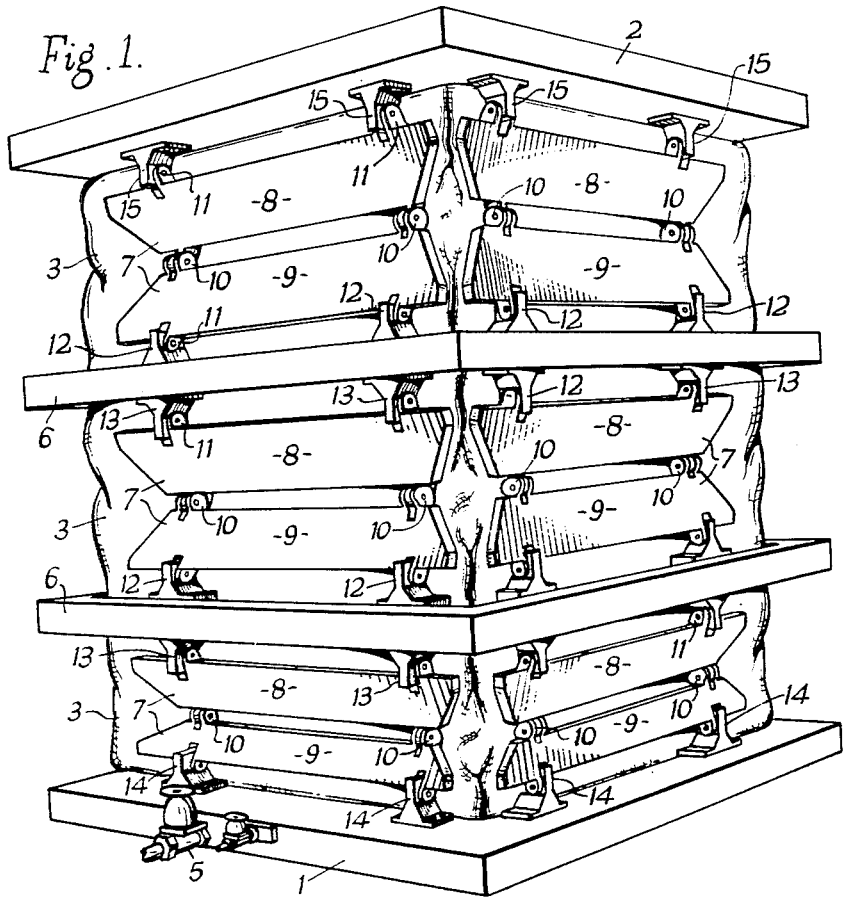
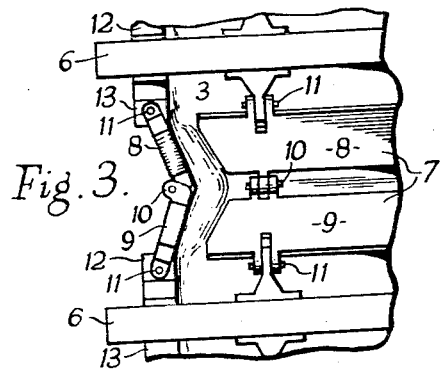
INVENTOR
Douglas G. Unthank
BY Ralph B. Stewart
ATTORNEY April 5, 1960    D. G. UNTHANK    2,931,409
COLLAPSIBLE TANKS
Filed Aug. 11, 1958    2 Sheets-Sheet 2
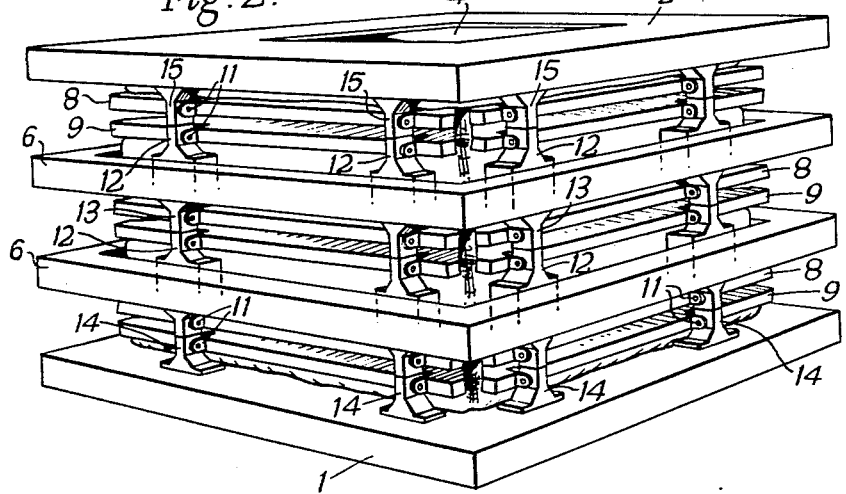
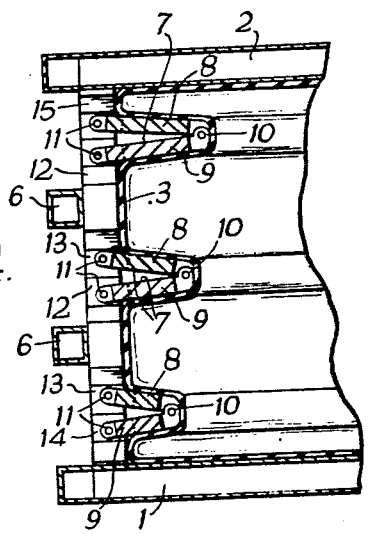
INVENTOR
Douglas G. Unthank
BY
Ralph B. Stewart
ATTORNEY

United States Patent Office 2,931,409
Patented Apr. 5, 1960

2,931,409

COLLAPSIBLE TANKS

Douglas G. Unthank, London, England, assignor of one-half to Henry Arthur John Silley, London, England Application August 11, 1958, Serial No. 754,262

Claims priority, application Great Britain August 14, 1957

4 Claims. (Cl. 150—.5)

The present invention is concerned with improvements in and relating to collapsible tanks for use on board ship, on road and rail vehicles and aircraft, hereinafter all referred to as vehicles, enabling a vehicle fitted with such a tank to be employed for the transport of liquid filling the tank, or for the transport of cargo in the space within the vehicle and outside the tank when the tank is in the collapsed or partly collapsed condition.

In the specification of Patent No. 2,623,565 there is described a collapsible tank which is straight-sided in plan and which includes a rigid top and a rigid bottom connected together by flexible side walls capable of being folded into a plurality of superimposed pleats, rigid horizontal frames adapted to establish the outer folds of the pleats, means for maintaining the frames in vertical alignment consisting of pairs of folding members distributed around the tank between each adjacent two frames and between the lowest frame and the bottom of the tank and the uppermost frame and the top of the of the tank, the two members of each pair being hinged together and also hinged respectively to the two frames or respectively to the lowest frame and the bottom of the tank or the upper frame and the top of the tank, about axes parallel to the side of the tank.

The frames are usually disposed external to the flexible walls of the tank and the folding members formed by pairs of elongated plates the hinge-connected edges of which fold inwards as the tank is collapsed and thereby establish or assist in establishing the inner folds of the pleats of the tank walls.

According to the present invention there is provided a collapsible tank having a rigid top and a rigid bottom connected together by side walls capable of being folded into a plurality of superposed pleats, one or more rigid horizontal frames adapted to establish the outer folds of the pleats, pairs of folding members hinge-connected between a frame and the top of the tank and a frame and the bottom of the tank and where a plurality of frames are employed, between adjacent frames, for maintaining vertical alignment and stop members for limiting the extent of movement of the top, and the frame or frames towards one another and towards the bottom of the tank as the tank is collapsed so that the top, frame or frames and the bottom are prevented from contacting one another.

Such stop members avoid or reduce the possibility of parts of the pleated parts of the tank wall from becoming pinched in the collapsed condition of the tank and furthermore they serve to transmit the load due to the weight of the rigid top of the tank and of any dry goods supported thereon in the collapsed condition of the tank by direct thrust to the rigid bottom of the tank, thus avoiding risk of distortion of the frames and the hinged folding members under such loads.

The tank may with advantage be constructed with pleats which in the extended condition of the tank are of successively increasing vertical width in the direction from the bottom towards the top of the tank.

The rate of increase in the vertical width of the pleats is determined in accordance with the differences in the stresses applied to the parts of the wall of the tank at different levels between the bottom and the top of the tank, such stresses being smallest at the top of the tank and increasing steadily towards the bottom of the tank. The high stresses in the lower part of the tank walls are of particular significance when, as is usual, the tank is filled with liquid introduced at the bottom, so that the varying width pleating or varying frame spacing is employed with the narrower pleats or frame spacing at the bottom of the tank.

By the use of pleats of increasing width towards the top of the tank it is made possible to use a tank of reduced total weight as compared with a tank of similar capacity having pleats of uniform vertical width, and also to keep the weight of the tank to a minimum whilst utilizing horizontal frames all of similar size and pattern.

Such saving of weight is a highly desirable feature inasmuch as it enables the useful weight load which can be carried by a given tank to be kept high, whilst the proportion of the tank weight to the total load weight of a loaded vehicle with the tank in collapsed condition is kept small.

The invention is illustrated by way of example in the accompanying drawings in which:

Fig. 1 is a view in perspective of one form of the tank in the extended condition.

Fig. 2 is a view in perspective of the tank of Fig. 1 in the collapsed or folded condition.

Fig. 3 is a view in front elevation and on a larger scale showing one end of one pleated section of the tank in the extended condition, and Fig. 4 is a view in front sectional elevation taken at one end of the tank of Figs. 1 and 2 and in the collapsed condition.

Referring to the drawings, the tank comprises a rigid rectangular base or bottom 1 suitable to rest upon or to be fixed to a floor, deck or the like, and a rigid rectangular top 2, and between the bottom 1 and the top 2 extends the tank wall 3 of general rectangular form in plan and formed of impervious flexible material such as natural or synthetic rubber impregnated fabric, and the ends of which are in sealed connection with the bottom 1 and top 2.

The top 2 of the tank is usually apertured as shown at 4 in Fig. 2 to give access to the interior of the tank e.g. for cleaning purposes, the aperture 4 being normally closed by a sealing cover (not shown) and filling and emptying of the tank being effected through a pipe 5 shown in Fig. 1 leading between the exterior through the rigid bottom 1 to the lower end of the interior of the tank.

The tank wall 3 is surrounded at selected vertical intervals considered in the extended condition as shown in Fig. 1 by horizontal rectangular rigid frames 6 fixedly connected with the tank wall 3. The rectangular frames 6, of which two are shown in the case illustrated, may be formed conveniently of closed box section metal.

The location of the frames 6 relative to the bottom 1 and top 2 and to one another is such that the vertical length of the pleats in the wall 3 of the tank between the top 1 and the upper frame 6 is greater than the vertical length of the pleats between the two frames 6, and the vertical length of the pleats between the two frames 6 is greater than the vertical length of the pleats between the lower frame 6 and the bottom 1 of the tank.

In the external spaces between the top 2, frames 6 and bottom 1 and on each side of the tank are provided pairs of folding connecting members 7 each formed by two plates 8 and 9 extending over the major part of the width of the adjacent side of the tank, the two plates being hinge-connected to one another at their adjacent edges as shown at 10 and hinge-connected at their outer edges to the top 2, a frame 6 or the bottom 1 as shown at 11.

These folding connecting members 7 serve to maintain the vertical alignment between the top 2, frames 6 and bottom 1 of the tank during collapsing and extension and also after extension of the tank, and they also serve to determine the maximum extent of the extension permitted to the tank whilst offering external mechanical protection for the flexible walls of the tank.

During collapsing of the tank the outer frames 6 serve to define the outer fold lines of the pleats in the tank wall 3 and the mutually hinge-connected edges of the two plates 8 and 9 of each folding connecting member 7 serve to define the inner fold lines of the pleats.

It is desirable to keep the folding connecting members 7 of the lightest construction consistent with their fulfilment of the above described functions but in the collapsed condition of the tank it is required that the structure shall be capable of supporting heavy and often unevenly distributed loads of goods resting upon the top 2 of the tank.

In order to avoid risk of buckling or otherwise damaging the folding connecting members 7 under such loads particularly where the tank is installed in a ship or other moving vehicle, stop members are provided to prevent contact between the top 2, the frames 6 and the bottom 1 in the collapsed condition of the tank and to transmit the load by direct downward thrust from the top 2 to the bottom 1, so that a stable structure is achieved in which the folding connecting members 7 are not subjected to any excessive stresses.

In the construction shown in the drawings stop members are provided in the form of posts 12 and 13 fixed to and extending above and below each of the frames 6 and posts 14 and 15 fixed on the upper side of the bottom 1 and the underside of the top 2 respectively in vertical alignment with the posts 12 and 13 and the arrangement is such that in the collapsed condition of the tank as shown in Figs. 2 and 4 the posts 12, 13, 14, 15, make endwise abutting engagement with the top 2, frame 6 and the bottom 1 and also the now outer ends of the parts 8 and 9 of the folding connecting members 7, held spaced from one another.

Thus the load of the top 2 of the tank is now transmitted direct by way of the registering posts to the bottom 1. At the same time the risk of parts of the folded tank wall 3 being pinched between the top, the frames and the bottom is avoided.

The posts 12 and 13 may be formed by the ends of blocks fixed to the inner surface of the frames 6 it being understood that the wall 3 of the tank is left unconnected with the frame 6 over short lengths to accommodate the blocks between the frame and the tank wall 3.

Conveniently, the posts 12, 13, 14 and 15 may also serve to mount the pivots of the hinge connections 11 of the folding connecting members 7 with the top 2, frames 6 and bottom 1, the posts being of a length to extend above or below the hinge axes to ensure the spaced disposition of the outer edges of the parts 8 and 9 of the folding connecting members 7 in the collapsed condition of the tank.

Instead of providing posts to form stop members on both the upper and lower sides of the frames 6 as well as on the bottom 1 and below the top 2, posts of appropriate length may be provided on a member 1, 6 or 2 at either the top or bottom end only of each pleated portion of the tank, for direct engagement with the adjacent surface of the member 1, 6 or 2 at the other end of the pleated portion of the tank in the collapsed condition of the tank.

I claim:

1. A collapsible tank having a rigid top and a rigid bottom connected together by a flexible side wall capable of being folded into a plurality of superposed pleats, one or more rigid horizontal frames secured to said flexible side wall adapted to establish the outer folds of the pleats, pairs of folding members hinge-connected to and between a frame and the top of the tank and a frame and the bottom of the tank and, where a plurality of frames are employed, to and between adjacent frames, for maintaining vertical alignment and stop members attached to at least some of the relatively moving members comprising the said rigid top, the said rigid bottom, and the said one or more rigid horizontal frames for limiting the extent of movement of the top and the frame or frames towards one another and towards the bottom of the tank as the tank is collapsed so that the top, frame or frames and the bottom are prevented from contacting one another.

2. A collapsible tank as claimed in claim 1 wherein the stop members are formed by posts fixedly mounted on at least some of the relatively movable members comprising the rigid top, the frame or frames and the rigid bottom of the tank, to extend above or below or above and below the movable members on which they are mounted, for engagement with the adjacent movable member or with further fixed posts mounted on an adjacent movable member in such a manner as to maintain the said relatively movable members spaced from one another in the collapsed condition of the tank.

3. A collapsible tank as claimed in claim 2 wherein the or each of the frames is provided with upwardly and downwardly extending fixed posts, the rigid bottom is provided with upwardly extending fixed posts vertically aligned with the downwardly extending posts on the adjacent frame and the rigid top is provided with downwardly extending fixed posts vertically aligned with the upwardly extending posts on the adjacent frame.

4. A collapsible tank as claimed in claim 1 wherein the individual pleated sections of the tank wall are of successively increasing vertical length in the direction from the bottom towards the top of the tank.

References Cited in the file of this patent

UNITED STATES PATENTS

| | | |
|---|---|---|
| 2,623,565 | Unthank | Dec. 30, 1952 |
| 2,725,087 | Potter | Nov. 29, 1955 |